April 18, 1967     F. E. HALLECK     3,314,194
SHIPPING AND GROWING CONTAINER FOR BULBS AND SEEDS
Filed Aug. 10, 1964     2 Sheets-Sheet 1

INVENTOR.
FRANK E. HALLECK
BY
*James V. Harmon*
ATTORNEY

April 18, 1967    F. E. HALLECK    3,314,194

SHIPPING AND GROWING CONTAINER FOR BULBS AND SEEDS

Filed Aug. 10, 1964    2 Sheets-Sheet 2

INVENTOR.
FRANK E. HALLECK
BY
James V. Harmon
ATTORNEY

United States Patent Office 3,314,194
Patented Apr. 18, 1967

3,314,194
SHIPPING AND GROWING CONTAINER FOR
BULBS AND SEEDS
Frank E. Halleck, Minnetonka, Minn., assignor to The
Pillsbury Company, Minneapolis, Minn., a corporation
of Delaware
Filed Aug. 10, 1964, Ser. No. 388,418
7 Claims. (Cl. 47—34.11)

The present invention relates to gardening supplies and more particularly to an improved combination shipping and growing container for bulbs and other plant propagation units.

A variety of shipping and growing containers have been previously proposed for plants. These containers have in the past been to some extent unsatisfactory particularly if used for shipping and growing bulbs or root cuttings and the like.

There has developed a particular need in recent years for a suitable shipping and growing container for house plants. The growth in this market has been favored by an increase in the number of family units, a broadening of culture interests and the expression of individuality. In the past, the shrinkage or loss of product up to the point of sale has been excessive. In many cases a loss as great as 25% has been experienced. It is therefore an object of the invention to provide a shipping and growing container particulraly well suited for house plants and including a provision for reducing losses due to spoilage up to the point at which the unit is sold. To be successful in this end use the container must also be reasonably priced and must promote growth of the plant after it has been purchased. Moreover it must present a handsome appearance both at the time of sale and later in the home of the consumer.

If a plant is to be grown from roots, bulbs and plants either dormant or nondormant, it must be kept in a dry condition properly centered and oriented in the shipping container, that is with the top of the bulb facing the top of the container. The stem, if present, must be protected. Moreover, it is preferred that moisture be supplied to the bulb or root from below rather than from above both to promote growth and to prevent the accumulation of fertilizer, when used, at the top of soil. The package must therefore be adapted to permit the introductions of fertilizer in either a solid, powdered or liquid form. Another requirement that is particularly significant in the growing of plants from bulbs is the need to maintain a humid environment around the exposed portion of the plant. It has been previously proposed that a hood or terrarium cover be used to provide the necessary humidity for certain plants during early development or throughout the growth cycle but in the past these hoods have been impractical for shipping and merchandising the plants because of the relatively large amount of space they occupy when the plant is in shipment. Hoods of this kind have therefore not come into widespread use.

Still another condition desired in the growing of plants from roots, bulbs and plants either dormant or nondormant is that the medium within which the plant grows be relatively light, porous and uncompacted. If earth is used as a base for this growing medium it is desirable to corporate a lightweight particulate material such as expended vermiculite with it to prevent it from becoming tightly compacted. Of course, if the growing medium is loose and free flowing, it can be easily spilled from the receptacle during shipment and storage unless enclosed in some manner. On the other hand, when the bulb begins to grow, it must be able to grow freely.

In view of these and other defects in the prior art it is one object of the present invention to provide an improved shipping and growing container for plants whereinn moisture can be supplied to the bulb, seed or root cutting from beneath.

Another object of the invention is the provision of an improved shipping and growing container for plants including a lightweight loosely packed growing medium and the means for reliably preventing the growing medium from spilling out of the container.

Another object of the invention is the provision of an improved shipping and growing container including a cover member for reliably holding the growing medium in the container and means for allowing the plant to grow upwardly without obstruction.

Yet another object of the invention is the provision of an improved shipping and growing container for plants within which a growing medium is placed including a relatively moisture impervious transparent terrarium hood releasably secured to the container.

Another object of the invention is the provision of an improved shipping and growing container for plants including an outer container and an inner container filled with a growing medium, a moisture storage reservoir therebetween and a foraminous storage medium between the bottom walls of the container to provide a continuous supply of water to the growing medium within the container.

Yet another object of the invention is the provision of an improved shipping and growing container for plants including a terrarium hood and a means for connecting the container and hood in a manner which will occupy relatively little space during storage and shipment.

Yet another object of the invention is the provision of an improved shipping and growing container for plants including a member for releasably locking the containers to each other for display purposes.

Briefly a preferred embodiment of the invention consists of a combined shipping and growing container including a container or pot preferably formed from lightweight plastic with an inner container of the same material positioned therein. Between the two containers is a layer of an absorbent material such as plastic foam having interconnecting cells so as to permit the diffusion of moisture from a fill opening downwardly to the area between the bottom wall of the containers. From this region the moisture travels by capillary action through openings into the earth or other growing medium within which a bulb is placed. After water has been added to the absorbent material, a closure member is removed so that the plant will be allowed to grow up through the cover.

These and other more detailed and specific objects will become apparent from the following specification and drawings wherein.

Figure 1:
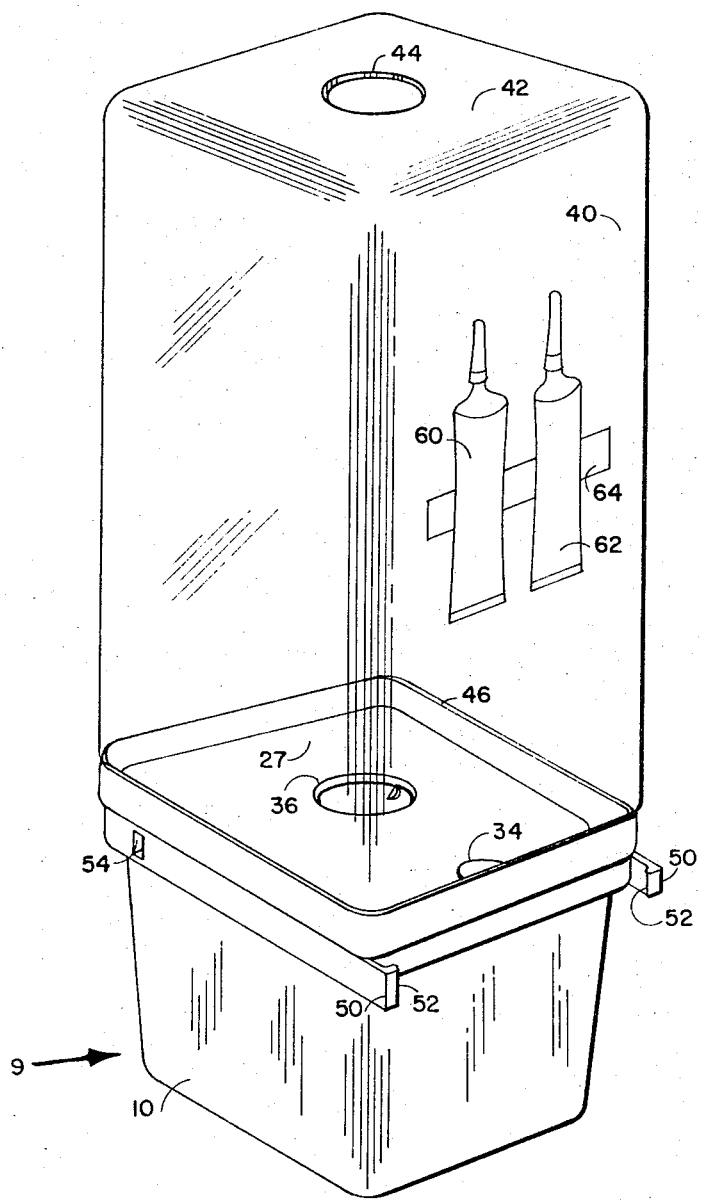
FIGURE 1 is a perspective view of a shipping and growing container embodying the invention.

Referring now to the drawings there is shown a shipping and growing container embodying the invention and including a growing receptacle indicated generally at 9 consisting of an outer and inner spaced apart relatively thin walled containers 10 and 12 respectively which are open at the top. The containers 10 and 12 each include four flat side walls which taper outwardly towards the top thereof and a flat bottom wall. The bottom wall of the inner container 12 is provided with a plurality of laterally spaced perforations or openings 13. Between the inner and outer containers 10 and 12 is provided a water reservoir within which is a light weight foraminous medium 14 containing a large number of interconnected chambers and interstices. While the variety of materials is suitable, a light weight plastic foam such as foamed polystyrene of the type having interconnecting cells will be satisfactory. It should be noted that the moisture retaining medium 14 abuts against the lower surface of the container 12 so as to facilitate the transfer of moisture from the space between the containers 10 and 12 to the growing medium 22 provided within the inner container 12. Placed in the growing medium 22 when the container is assembled is a plant propagation body designated 24 such as a dormant plant, bulb, live plant seed or the like, for convenience hereinafter referred to as a bulb by way of example. The bulb 24 is preferably centered by filling the container 12 about half full, placing the bulb in the growing medium and then placing the remaining portion of the growing medium within the container 12.

Figure 3:
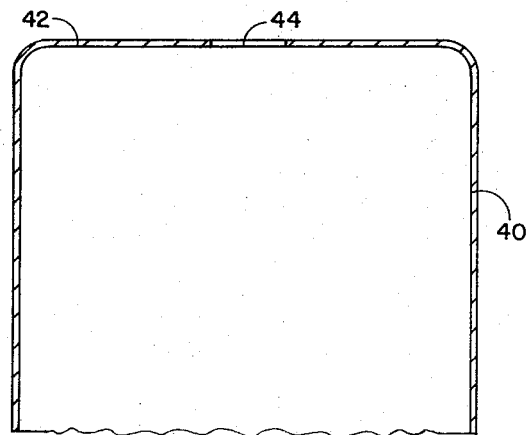
FIGURE 3 is a partial vertical sectional view taken on line 3—3 of FIGURE 2.

Positioned above the container 12 and extending in a horizontal plane over the growing medium 22 is a flat cover member 27. Cover 27 includes edges 28 (FIGURE 3) which are frictionally engaged within the upper edges 30 of the container 10. As can be clearly seen in FIGURE 3, the top edge of the container 12 is recessed slightly below the top edge of the container 10 whereby the cover 27 holds the container 12 securely in place against the cellular material 14.

At one edge of the cover 27 is a fill opening 32 within which is positioned a closure element 34. When the growth of the bulb is to be started the closure element 34 is removed and water is placed in the container 12 through the opening 32. Beneath opening 32 is a humidity indicator 33 of the type which undergoes a color change when it becomes desiccated. The opening 32 can be located anywhere around the periphery of the cover 27 above the material 14.

At the center of the cover 27 is a second removable closure 36 positioned frictionally within an opening 38. When the growth of the bulb is started, the closure element 36 is removed manually. In the event that the bulb 24 begins to grow prematurely or should one forget to remove the closure 36, the pressure of the leaf tips against the lower portion of the removable closure 36 will force it out of the opening 38. It should be noted that after the closure element 36 is removed, the growing medium 22 will be retained in place by the cover 27 but the leaves of the plant will be free to grow upwardly without obstruction. The invention thus reliably prevents the growing medium from being spilled but at the same time permits free growth of the plant.

Figure 2:
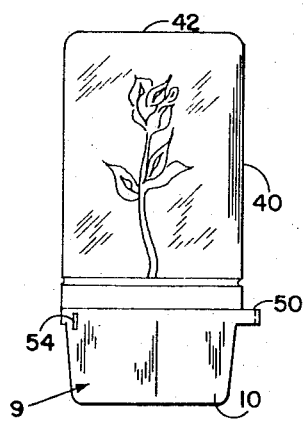
FIGURE 2 is a side elevational view partly in section of a container embodying the invention.
Figure 4:
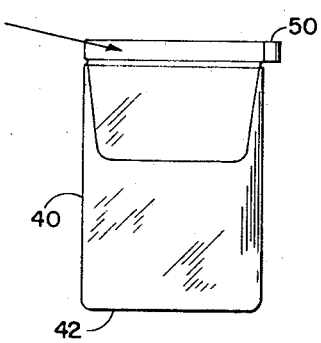
FIGURE 4 is a side elevational view showing the relative positions of the soil containing receptacle and hood when nested for shipment or storage.

A transparent hood or dome 40 is frictionally and releasably connected to the upper edge of the outer receptacle 10 for maintaining a relatively high humidity environment to facilitate the plant's growth. The dome 40 includes upwardly extending and substantially parallel side walls and the top wall 42 having a central opening 44 the size of which is sufficient to permit adequate diffusion of gases to and from the plant. For most purposes an opening of from ½ to 2 inches in diameter will be sufficient. The dome 40 is provided with a circumferentially extending and centrally projecting ridge or rib 46 adapted to engage the upper edge of the container 10 when in the erect position of FIGURES 2 and 3. As best seen in FIGURE 4, the hood 40 is inverted and frictionally engaged on the upward edge 30 from its lower side to prepare it for shipment. In this manner, a substantial space saving can be accomplished with the invention. Gas exchange will take place through the opening 44 without substantial loss of moisture.

Figure 5:
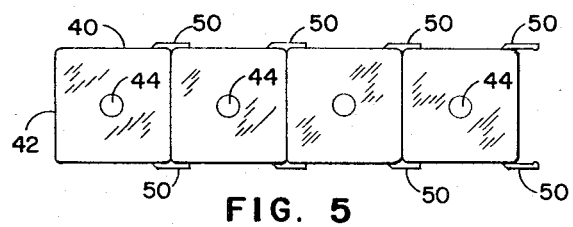
FIGURE 5 is a plan view of a container embodying the invention when connected to a plurality of similar containers.

As can be clearly seen in FIGURES 4 and 5 a pair of laterally extending horizontally disposed and parallel tabs 50 are provided on the upward edges of the receptacle 10 just below the lower edge of the hood 40. Each of the tabs 50. They can, for example, extend from the top of snap fit into a pair of laterally spaced centrally extending depressions 54 located on the top of opposed sides of each of the receptacles 9. Thus, a whole series of receptacles 9 can be connected together by snapping the lugs 52 at the ends of the tabs 50 into the depressions 54 of an adjacent receptacle. Many variations can be made in the tabs 50. They can, for example, extend from the top of the container 12 to the bottom thereof in which event the depressions 54 should be lengthened accordingly.

In a preferred embodiment of the invention package within the hood 40, a pair of containers such as tubes 60 and 62 one of which is filled with concentrated fertilizer of any suitable known type and the other of which is filled with a growth retarding chemical or hormone. An antibiotic can be provided in tube 62 if desired. The tubes are held in place during shipment with a tape 64. When they are to be used, the tape 64 is removed and a portion of the contents of each expelled into the opening 32.

To assemble the receptacle according to the present invention, the moisture retaining medium 14 is placed in the container 10. The container 12 is then put in place. The growing medium 22 is then placed in the container 12, about half of it being placed in the container at first. The bulb 24 or other plant propagating body is then put in place and the cover 27 forced frictionally and telescopically into the position of FIGURE 3 with the edges thereof abutting against the inside edge of the top 30 of container 12. Closure members 36 and 34 are then put into place. Finally the hood 40 is frictionally engaged on the edge 30 as seen in FIGURE 4. The package is stored and shipped in this condition.

When the package is to be sold, the closure 34 is removed preferably by the retailer and water is introduced through the opening 32 until the medium 14 is saturated with moisture. Due to the close contact of material 14 and the bottom wall of container 12, moisture will be carried by capillary action upwardly through the openings 13 into the growing medium 22 thereby initiating the growth of the bulb 24. The package can be retailed with the hood 40 either in the shipping position of FIGURE 4 or in the erected position of FIGURE 2. After the package has been purchased, the hood 42 should be kept in erected position of FIGURE 2 to provide a humid growing environment for the plant.

Any of a variety of materials can be employed for forming the hood, receptacle walls and cover but they are preferably formed from an organic resin such as polystyrene, cellulose acetate or A.B.S. resin. If polystyrene resin is used, either a general purpose or a high density resin having a thickness of from about five to fifteen mills will be satisfactory. A thickness of 10 mills is preferred. The containers as well as the dome can be formed in any suitable manner as by injection molding or vacuum forming.

The invention has a wide variety of uses. While it can be used for shipping and growing seed propagated plants it is particularly valuable for use in connection with bulbs, miniature rose bushes, ferns, bonsai evergreens and herbs. Among the many bulb propagated plants that can be used are Achimenes; Babiana; Cyclamen; Freesia; Gloriosa and Haemanthus. Some of the many ferns which can be propagated in the shipping and growing container of the invention are Tree fern, Tongue fern, Wing fern and Spleen wort. Among the large number of herbs which can be grown in containers according to the invention are *Allium schoenoprasum*, *Anthemis nobilis*, *Foeniculum volgare* and *Laurus nobilis*. While a few plants have been named by way of example many others will be apperent to those skilled in the art.

With the cover 27 frictionally engaged within the container 10, it will be seen that no additional means for securing the container 12 in place is required thereby reducing the cost of raw materials and assembly. It should also be noted that no adhesive is required for securing the cover 27 in position. In this way the time required in the assembly operation can be substantially reduced compared with a container requiring adhesive or other fastening means for securing the parts in place. At the same time the cover 27 reliably retains the soil 22 in the container 12 during shipment and storage even though the latter may be loose and free flowing. The cover 27 may therefore be thought of as providing a dual function. Since the closure 36 is frictionally retained in the opening 38, it can be removed by the upward growth of the plant. It may therefore be considered adapted for removal by the application of pressure to its lower surface. While the dome 40 has been illustrated as rectangular, it can if desired be hemispherical at the upper end thereof as seen in FIGURE 1. Obviously, it can be circular in cross section rather than rectangular.

It is apparent that other modifications and variations of this invention as hereinbefore set forth may be made without departing from the spirit and scope thereof. The specific embodiments described are given by way of example only and the invention is limited only by the terms of the appended claims.

I claim:

1. A combined shipping and growing container for plants including a generally rectangular container formed from a resinous material, an inner container of the same material positioned therein and spaced therefrom, the bottom of the inner container having openings therein, a layer of a moisture absorbent material between the two containers, said layer having interconnecting cells so as to permit the diffusion of moisture downwardly to the area between the bottom walls of the containers, said moisture being adapted to travel by capillary action through said openings into said inner container after water has been added to the absorbent material and a moisture impervious cover sealed over the inner container having a removable closure member therein for permitting said plant to grow up through the cover and a transparent dome adapted to be removably secured to the top of the generally rectangular container.

2. shipping and growing receptacle for plants comprising in combination a receptacle assembly having a vessel adapted to contain a growing medium, a growing medium supplied therein, a plant propagation body within the growing medium, a reservoir for storing moisture, the vessel including openings between the growing medium and the reservoir, said openings defining a communicating passage between the reservoir and the growing medium for conducting said moisture within the reservoir to the growing medium from the reservoir, a gas impervious light transparent dome releasably engaged on the upward edges of said vessel, said dome including a downwardly extending flange adapted to engage the receptacle assembly and fit frictionally upon the upward edge thereof either from the top or from the bottom whereby the receptacle can be shipped with the said vessel nested within the dome and the dome later removed, inverted and placed upon the upward edge of the vessel and extending upwardly therefrom.

3. The container according to claim 2 wherein the said vessel comprises a thin walled container open at the top and having moisture impervious side walls inclined outwardly proceeding upwardly and a bottom wall, a light weight foraminous moisture retaining medium disposed adjacent the bottom wall of said container, said container having openings therein communicating with the foraminous material and disposed in contact therewith, a growing medium in the inner container, a cover member disposed in a horizontal plane to extend across the upward edge of the inner container for retaining the growing medium within the inner container and a filling means communicatively connected with the reservoir for supplying moisture thereto.

4. A combined growing and shipping receptacle for plants comprising in combination:
 (a) an inner container formed from a rigid moisture impervious material,
  (1) said container having side walls and bottom wall,
  (2) said inner container also having openings in the lower portion thereof to allow moisture to enter the inner container,
 (b) an outer container formed from a rigid moisture impervious material,
  (1) said outer container including side walls and
  (2) a bottom wall spaced outwardly from the inner container to define a chamber between the inner and outer walls,
 (c) a foraminous moisture retaining medium positioned between the inner and outer containers in intimate contact with the lower surface of the bottom wall of said inner container,
 (d) a cover member formed from a rigid moisture impervious material extending over the opening at the upward end of said inner container and outer container and
  (1) positioned in sealing relationship with the upward edges of said inner and outer containers,
  (2) said cover member having an opening therein between the inner and outer containers for introducing moisture to the foraminous moisture retaining medium,
 (e) the moisture thus introduced between the inner and outer containers into said foraminous moisture retaining medium being adapted to flow upwardly through said openings by capillary action.

5. The receptacle according to claim 4 wherein the cover member is secured to the outer container and extends over the upward edge of the inner container to securely retain the inner container in position, said inner container being retained within the outer container solely by said cover member.

6. A receptacle according to claim 4 wherein a connecting member is integrally secured to the said outer container for releasably locking and holding the plurality of said receptacles adjacent one another for display purposes.

7. A receptacle according to claim 4 including a humidity sensitive indicator member positioned therein and adapted to undergo color change when said member becomes desiccated.

References Cited by the Examiner

UNITED STATES PATENTS

| | | | |
|---|---|---|---|
| 1,669,617 | 5/1928 | Kennedy | 47—34.11 |
| 2,089,220 | 8/1937 | Norman | 47—38.1 |
| 2,238,818 | 4/1941 | Mulford et al. | 47—34.11 |
| 2,246,490 | 6/1941 | Flues | 47—34 |
| 2,583,822 | 1/1952 | Duncan | 220—23.4 |
| 2,632,286 | 3/1953 | Newhall | 47—34.11 X |
| 2,799,972 | 7/1957 | Teixeira | 47—34 |
| 2,814,910 | 12/1957 | Reparon | 47—34.11 |
| 3,009,291 | 11/1961 | Blackmore | 47—34.13 |
| 3,021,046 | 2/1962 | Pullen | 47—34.11 X |
| 3,043,053 | 7/1962 | Peters | 47—38.1 |
| 3,082,575 | 3/1963 | Shulz | 47—37 |
| 3,095,670 | 7/1963 | Raab | 47—37 X |
| 3,106,801 | 10/1963 | Risacher | 47—17 |
| 3,131,829 | 5/1964 | Masser | 220—102 |

ABRAHAM G. STONE, *Primary Examiner.*

J. R. OAKS, *Assistant Examiner.*